(12) United States Patent
Newstadt

(10) Patent No.: US 7,383,568 B1
(45) Date of Patent: Jun. 3, 2008

(54) SECURITY MANAGEMENT ADMINISTRATION SYSTEM AND METHOD

(75) Inventor: Keith Newstadt, West Newton, MA (US)

(73) Assignee: Symantec Corporation, Cupertino, CA (US)

( * ) Notice: Subject to any disclaimer, the term of this patent is extended or adjusted under 35 U.S.C. 154(b) by 807 days.

(21) Appl. No.: 10/840,127

(22) Filed: May 5, 2004

(51) Int. Cl.
*G06F 17/00* (2006.01)
*H04K 1/00* (2006.01)
*H04L 9/00* (2006.01)

(52) U.S. Cl. ........................................................ 726/1
(58) Field of Classification Search ................ 726/21, 726/1
See application file for complete search history.

(56) References Cited

U.S. PATENT DOCUMENTS

| | | | | |
|---|---|---|---|---|
| 5,673,428 A * | 9/1997 | Hirakawa | .................. | 707/5 |
| 5,995,951 A * | 11/1999 | Ferguson | ................... | 706/10 |
| 6,247,032 B1 * | 6/2001 | Bernardo et al. | .......... | 715/530 |
| 6,289,460 B1 * | 9/2001 | Hajmiragha | ................. | 726/28 |
| 6,304,861 B1 * | 10/2001 | Ferguson | ................... | 706/10 |
| 6,308,188 B1 * | 10/2001 | Bernardo et al. | .......... | 715/530 |
| 6,351,777 B1 * | 2/2002 | Simonoff | .................... | 709/250 |
| 6,397,191 B1 * | 5/2002 | Notani et al. | .................. | 705/9 |
| 6,557,028 B2 * | 4/2003 | Cragun | ....................... | 709/205 |
| 6,560,637 B1 * | 5/2003 | Dunlap et al. | ............... | 709/204 |
| 6,643,663 B1 * | 11/2003 | Dabney et al. | ............. | 707/102 |
| 6,707,465 B2 * | 3/2004 | Yamazaki et al. | .......... | 345/629 |
| 6,708,172 B1 * | 3/2004 | Wong et al. | ................... | 707/10 |
| 7,020,697 B1 * | 3/2006 | Goodman et al. | .......... | 709/223 |
| 7,130,858 B2 * | 10/2006 | Ciaramitaro et al. | ........ | 707/101 |
| 7,143,089 B2 * | 11/2006 | Petras et al. | ................... | 707/5 |
| 7,254,581 B2 * | 8/2007 | Johnson et al. | ............. | 707/100 |
| 2001/0012019 A1 * | 8/2001 | Yamazaki et al. | .......... | 345/639 |
| 2001/0042056 A1 * | 11/2001 | Ferguson | ..................... | 706/10 |
| 2001/0047290 A1 * | 11/2001 | Petras et al. | .................. | 705/10 |
| 2002/0072049 A1 * | 6/2002 | Prahalad | ..................... | 434/365 |
| 2003/0009521 A1 * | 1/2003 | Cragun | ....................... | 709/205 |
| 2003/0046193 A1 * | 3/2003 | Aschick et al. | ............... | 705/28 |
| 2003/0061130 A1 * | 3/2003 | Hoffman et al. | .............. | 705/30 |
| 2003/0112273 A1 * | 6/2003 | Hadfield et al. | ............. | 345/751 |
| 2004/0044648 A1 * | 3/2004 | Anfindsen et al. | ............. | 707/1 |
| 2004/0085354 A1 * | 5/2004 | Massand | ..................... | 345/751 |
| 2004/0175095 A1 * | 9/2004 | Freeman | ...................... | 386/46 |
| 2004/0205065 A1 * | 10/2004 | Petras et al. | .................. | 707/5 |
| 2004/0205653 A1 * | 10/2004 | Hadfield et al. | ............ | 715/530 |
| 2004/0221323 A1 * | 11/2004 | Watt | ........................... | 725/135 |
| 2005/0004951 A1 * | 1/2005 | Ciaramitaro et al. | ..... | 707/104.1 |
| 2005/0060324 A1 * | 3/2005 | Johnson et al. | ............. | 707/100 |
| 2005/0138554 A1 * | 6/2005 | Bell et al. | .................... | 715/530 |
| 2007/0130339 A1 * | 6/2007 | Alcorn et al. | ............... | 709/225 |

* cited by examiner

*Primary Examiner*—Nasser Moazzami
*Assistant Examiner*—David Garcia Cervetti
(74) *Attorney, Agent, or Firm*—Gunnison, McKay & Hodgson, L.L.P.; Serge J. Hodgson

(57) ABSTRACT

A method includes defining areas of ownership for users of a computer system; receiving a proposed modification from a first user of the users, the first user being an owner of the proposed modification, wherein a set of the users are stakeholders in the proposed modification; and receiving decisions from a selected set of the stakeholders on approval of the proposed modification. Upon receiving the approvals from all of the selected stakeholders, the owner is granted permission to implement the proposed modification.

26 Claims, 5 Drawing Sheets

SECURITY MANAGEMENT ADMINISTRATION SYSTEM AND METHOD

BACKGROUND OF THE INVENTION

1. Field of the Invention

The present invention relates to the protection of computer systems. More particularly, the present invention relates to a security management administration system and method.

2. Description of Related Art

A user's access rights are limited by defining security roles and responsibilities for the user. However, a user's organizational role often requires that the user take responsibility for and accomplish tasks that lie, at least partially, outside of the user's defined security roles and responsibilities.

To accomplice such a task, the user must determine which permissions are required to accomplish the task and the individuals that have been granted these permissions. The user communicates with each of the individuals as to the change that the individual needs to make, as well as the timing of the distribution of the changes.

As should be readily apparent, accomplishing such a task is logistically difficult. Specifically, identifying the individuals that can grant the permissions and reaching agreement among the group of individuals as to the changes that each will make as well as the timing of the changes can be extremely difficult. This is particularly true when the individuals are located at different geographical locations.

SUMMARY OF THE INVENTION

In accordance with one embodiment, a method includes defining areas of ownership for users of a computer system; receiving a proposed modification from a first user of the users, the first user being an owner of the proposed modification, wherein a set of the users are stakeholders in the proposed modification; and receiving decisions from a selected set of the stakeholders on approval of the proposed modification. Upon receiving the approvals from all of the selected stakeholders, the owner is granted permission to implement the proposed modification.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

In accordance with one embodiment, a user (owner) is allowed to initiate and drive a task for which two or more principles (stakeholders) must be involved. Users' roles, instead of being a limit on a user's abilities, are used to create areas of ownership, i.e., fiefdoms, enabling an owner to accomplish the task.

In accordance with this embodiment, a user is allowed to make a modification, despite the user's level of permissions. The modifications do not take immediate affect. The modifications are submitted to a change repository, and the user is assigned ownership, i.e., becomes the owner of the proposed modification.

The stakeholders in the proposed modification are notified. Upon receiving the notification, each stakeholder enters the system, reviews the proposed modification, and rejects or approves the proposed modification. Once the owner receives the approvals from all of the necessary stakeholders, the proposed modification is implemented by the owner and put into effect.

Figure 1:
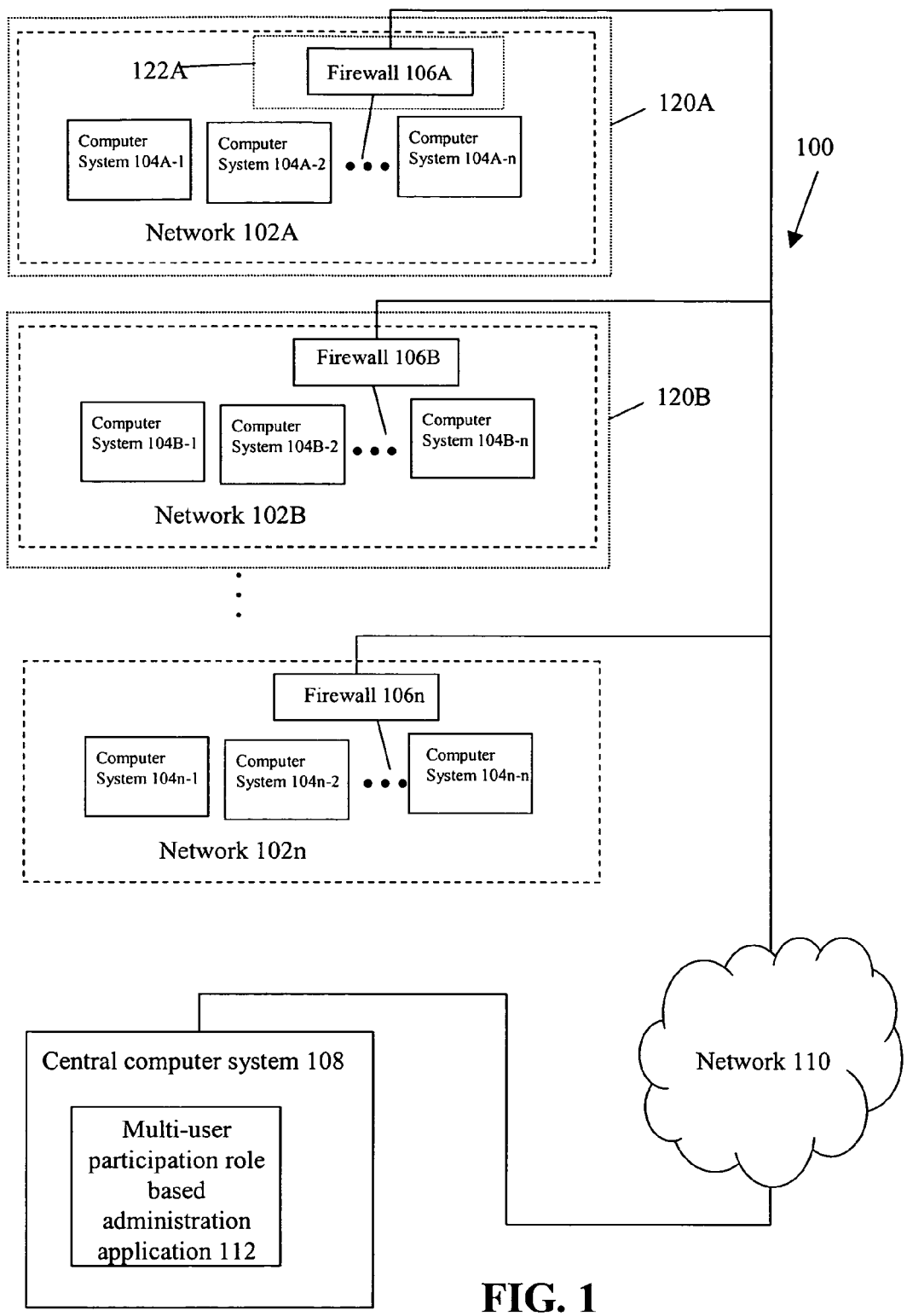
FIG. 1 is a diagram of a computer system that includes a plurality of networks in accordance with one embodiment of the present invention.

More particularly, FIG. 1 is a diagram of a computer system 100 that includes a plurality of networks 102A, 102B, . . . , 102n, collectively networks 102, in accordance with one embodiment of the present invention. Referring to network 102A, network 102A includes a plurality of interconnected computer systems 104A-1, 104A-2, . . . , 104A-n, collectively computer systems 104A. Network 102A further includes a firewall 106A also coupled to computer systems 104A-1, 104A-2, . . . , 104A-n.

Similarly, networks 102B, . . . , 102n also include a plurality of interconnected computer systems 104B-1, 104B-2, 104B-n, . . . , 104n-1, 104n-2, . . . , 104n-n, respectively. Computer systems 104B-1, 104B-2, . . . , 104B-n, . . . , 104n-1, 104n-2, . . . , 104n-n, are collectively referred to as computer systems 104B, . . . , 104n, respectively.

Networks 102B, . . . , 102n further include firewalls 106B, . . . , 106n also coupled to computer systems 104B, . . . , 104n, respectively.

Computer systems 104A, 104B, . . . , 104n and firewalls 106A, 106B, . . . , 106n are collectively referred to as computer systems 104 and firewalls 106, respectively.

The particular type of and configuration of networks 102, computer systems 104 and firewalls 106 are not essential to this embodiment of the present invention.

Networks 102, and, more particularly, firewalls 106 are coupled to a central computer system 108 by a network 110. Network 110 is any network or network system that is of interest to a user. A multi-user participation role based administration application 112 is executing on central computer system 108.

In accordance with one embodiment, a user 120A is responsible for network 102A, e.g., an administrator of network 102A. A user 122A is responsible for firewall 106A of network 102A. Accordingly, user 120A and user 122A have permission to modify the firewall policy of firewall 106A. A user 120B, sometimes called a first user of the users of computer system 100, is responsible for network 102B, e.g., an administrator of network 102B. User 120B has permission to modify the firewall policy of firewall 106B but not of firewall 106A.

Illustratively, network 102A is located at a first office and network 102B is located at a second office, e.g., geographically located at a distance from the first office and perhaps even on a different time standard.

User 120B is tasked with reconfiguring the firewall policy of firewall 106B and firewall 106A. For example, user 120B is tasked with allowing a certain type of traffic to flow between computer system(s) 104B, e.g., servers, of network 102B and computer system(s) 104A, e.g., servers, of network 102A. As part of this task, the firewall policy of firewalls 106A and 106B needs to be reconfigured.

As another example, user 120B is tasked with changing the routing of network 110. As part of this task, the firewall policy of firewalls 106A and 106B needs to be reconfigured.

Figure 2:
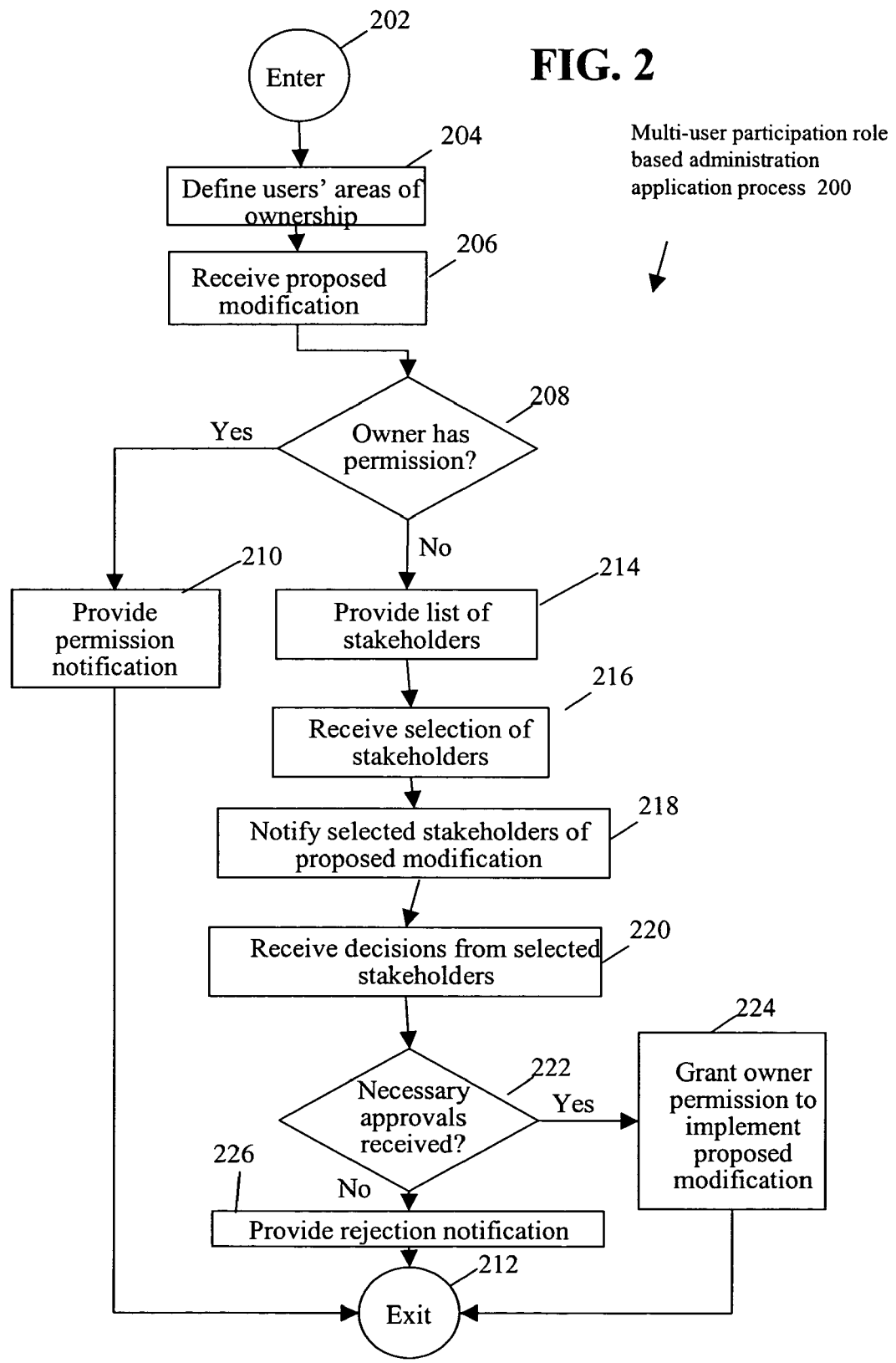
FIG. 2 is a flow diagram of a multi-user participation role based administration application process in accordance with one embodiment of the present invention.

FIG. 2 is a flow diagram of a multi-user participation role based administration application process 200 in accordance with one embodiment of the present invention. Execution of multi-user participation role based administration application 112 on central computer system 108 results in the operations of multi-user participation role based administration application process 200 as described below in one embodiment.

Referring now to FIGS. 1 and 2 together, from an ENTER OPERATION 202, flow moves to a DEFINE USERS' AREAS OF OWNERSHIP OPERATION 204. In DEFINE USERS' AREAS OF OWNERSHIP OPERATION 204, areas of ownership, sometimes called fiefdoms, for users are defined.

More particularly, a user's role and responsibility, hereinafter collectively referred to as the user's role, is the limit of the user's abilities and limits what the user is allowed to do. By knowing what the limits are of what the user is allowed to do, an area of ownership for the user is defined. Specifically, the area of ownership of a user is defined as the area in which the user has permissions to make modifications.

In one embodiment, the area of ownership of a user is defined geographically. More particularly, a user, e.g., an administrator, is restricted to permissions involving an office, subnet, or other configuration of devices at a particular physical location or locations.

In another embodiment, the area of ownership of a user is defined by a type of configuration. Examples of configurations include network configurations and security policy configuration.

Security policy configurations, sometimes called security policies, include configurations of firewalls, anti-virus applications, and intrusion detection systems. Network configurations include network structures used to interconnect all of the devices, e.g., computers and servers.

To illustrate, assume a network configuration where a first office is interconnected with a second office with a special T1 line that goes through a third office. The security policy configuration is that only traffic of a particular type, e.g., mail traffic, is allowed between the first office and the second office. The network configuration is to be modified and the T1 line is to be rerouted to go directly between the first office and the second office, but only the same particular type of traffic is allowed between the first office and the second office. In accordance with this example, the network policy configuration has changed but not security policy configuration, i.e., the type of traffic allowed.

To continue with the example illustrated in FIG. 1, in DEFINE USERS' AREAS OF OWNERSHIP OPERATION 204, areas of ownership are defined for users 120A, 120B and 122A. More particularly, the area of ownership of user 120A is network 102A including firewall 106A. The area of ownership of user 120B is network 102B including firewall 106B. The area of ownership of user 122A is firewall 106A.

From DEFINE USERS' AREAS OF OWNERSHIP OPERATION 204, flow moves to a RECEIVE PROPOSED MODIFICATION OPERATION 206. As discussed further below with respect to a MAKE PROPOSED MODIFICATION OPERATION 304 and SUBMIT PROPOSED MODIFICATION OPERATION 306 of FIG. 3, a user makes a proposed modification and submits the proposed modification to central computer system 108. In accordance with one embodiment, a user, sometimes called a first user, who submits a proposed modification is defined as an owner of the proposed modification.

The proposed modification is dependent upon the task the user is assigned. Any one of a number of particular tasks and proposed modifications are possible. For example, to allow a certain type of traffic to flow between servers located in difference offices, firewall policy of firewalls in each office will have to be reconfigured. In another example, changing the routing of a network requires that certain aspects of firewall policy be reconfigured.

In yet another example, an administrator is tasked with ensuring that traffic is allowed between all development subnets in a company and the subnets are in different offices scattered throughout the country. The administrator only has permission to modify the firewall configuration in one office.

Often, different security roles are defined for security configurations in different offices and often network reconfiguration is a different role from firewall policy reconfiguration. Thus, a task often requires a modification that spans several areas of ownership outside of the user's area of ownership.

To continue with the example illustrated in FIG. 1, user 120B submits a proposed modification. Accordingly, user 120B is the owner of the proposed modification and thus will hereinafter be referred to as owner 120B. In this example, the proposed modification includes a reconfiguration of the firewall policies of firewalls 106A and 106B.

From RECEIVE PROPOSED MODIFICATION OPERATION 206, flow moves to an OWNER HAS PERMISSION CHECK OPERATION 208. In OWNER HAS PERMISSION CHECK OPERATION 208, a determination is made as to whether the owner has all of the necessary permission to implement the proposed modification. If a determination is made that the owner has all of the necessary permission, flow moves to a PROVIDE PERMISSION NOTIFICATION OPERATION 210. Conversely, if the owner does not have all of the necessary permission, flow moves to a PROVIDE LIST OF STAKEHOLDERS OPERATION 214.

As set forth above in DEFINE USERS' AREAS OF OWNERSHIP OPERATION 204, areas of ownership are defined for all of the users. Accordingly, if the proposed modification falls entirely within the area of ownership of the owner, a determination is made that the owner has all of the necessary permission in OWNER HAS PERMISSION CHECK OPERATION 208. However, if the proposed modification falls out of the area of ownership of the owner and thus into the area of ownership of another user, a determination is made that the owner does not have all of the necessary permission in OWNER HAS PERMISSION CHECK OPERATION 208.

In PROVIDE PERMISSION NOTIFICATION OPERATION 210, a notification is provided to the owner that the owner has all of the necessary permission to implement the proposed modification. Flow moves from PROVIDE PERMISSION NOTIFICATION OPERATION 210 to an EXIT OPERATION 212 and exits or returns to RECEIVE PROPOSED MODIFICATION OPERATION 206 when a new proposed modification is received.

Conversely, if a determination is made that the owner does not have all of the necessary permission, flow moves to PROVIDE LIST OF STAKEHOLDERS OPERATION 214.

Returning again to the example of FIG. 1, owner 120B does not have permission to reconfigure the firewall policy of firewall 106A. The proposed modification submitted by owner 120B includes a reconfiguration of the firewall policy of firewall 106A. Accordingly, in OWNER HAS PERMISSION CHECK OPERATION 208, a determination is made that the owner does not have all of the necessary permission, and flow moves to PROVIDE LIST OF STAKEHOLDERS OPERATION 214.

In PROVIDE LIST OF STAKEHOLDERS OPERATION 214, a list of stakeholders, sometimes called a set of the users, in the proposed modification is provided to the owner. In accordance with one embodiment, a stakeholder is a user whose area of ownership includes at least part of the proposed modification. Stated another way, if at least part of the proposed modification falls within the area of ownership of a user, the user is a stakeholder of the proposed modification.

In accordance with one embodiment, areas of ownership of users are not mutually exclusive. More particularly, areas of ownership of users can overlap. For example, referring again to the example of FIG. 1, the area of ownership of user 120A includes firewall 106A. Further, the area of ownership of user 122A also includes firewall 106A. The proposed modification includes a reconfiguration of the firewall policy of firewall 106A. Accordingly, user 120A and user 122A are both stakeholders of the proposed modification and are hereinafter referred to as stakeholders 120A and 122A.

Thus, in PROVIDE LIST OF STAKEHOLDERS OPERATION 214, owner 120B is provided with a list of stakeholders listing stakeholders 120A and 122A.

From provide list of stakeholders, the owner selects the particular stakeholder or stakeholders, sometimes called a set of the stakeholders, from which approvals of the proposed modification within the stakeholders' area of ownership will be requested. This selection of stakeholders is received in RECEIVE SELECTION OF STAKEHOLDERS OPERATION 216. More particularly, flow moves from PROVIDE LIST OF STAKEHOLDERS OPERATION 214 to RECEIVE SELECTION OF STAKEHOLDERS OPERATION 216.

Referring again to the example illustrated in FIG. 1, owner 120B selects stakeholder 120A or 122A. In this illustration, owner 120B selects stakeholder 120A. This selection by owner 120B is received by multi-user participation role based administration application 112 in RECEIVE SELECTION OF STAKEHOLDERS OPERATION 216.

From RECEIVE SELECTION OF STAKEHOLDERS OPERATION 216, flow moves to a NOTIFY SELECTED STAKEHOLDERS OF PROPOSED MODIFICATION OPERATION 218.

In NOTIFY SELECTED STAKEHOLDERS OF PROPOSED MODIFICATION OPERATION 218, the selected stakeholders are notified of the proposed modification. The selected stakeholders enter the system, review the proposed modification and reject or approve the proposed modification. The rejection or approval of the proposed modification from each of the stakeholders is received in a RECEIVE DECISIONS FROM SELECTED STAKEHOLDERS OPERATION 220. More particularly, flow moves from NOTIFY SELECTED STAKEHOLDERS OF PROPOSED MODIFICATION OPERATION 218 to RECEIVE DECISIONS FROM SELECTED STAKEHOLDERS OPERATION 220.

Referring again to the example of FIG. 1, stakeholder 120A is notified of the proposed modification in NOTIFY SELECTED STAKEHOLDERS OF PROPOSED MODIFICATION OPERATION 218. Stakeholder 120A reviews the proposed modification and decides to accept the proposed modification. The decision to accept the proposed modification by stakeholder 120A is received by multi-user participation role based administration application 112 in RECEIVE DECISIONS FROM SELECTED STAKEHOLDERS OPERATION 220.

From RECEIVE DECISIONS FROM SELECTED STAKEHOLDERS OPERATION 220, flow moves to a NECESSARY APPROVALS RECEIVED CHECK OPERATION 222. In NECESSARY APPROVALS RECEIVED CHECK OPERATION 222, a determination is made as to whether all of the necessary approvals from the selected stakeholders have been received.

If a determination is made that all of the necessary approvals from the selected stakeholders have been received, flow moves to a GRANT OWNER PERMISSION TO IMPLEMENT PROPOSED MODIFICATION OPERATION 224. Conversely, if a determination is made that at least one of the necessary approvals from the selected stakeholders have not been received, flow moves to a PROVIDE REJECTION NOTIFICATION 226.

In accordance with one embodiment, if at least one stakeholder rejects the proposed modification, a determination is made that not all of the necessary approvals have been received in NECESSARY APPROVALS RECEIVED CHECK OPERATION 222. In accordance with this embodiment, all of the stakeholders must approve the proposed modification before a determination is made that all of the necessary approvals have been received in NECESSARY APPROVALS RECEIVED CHECK OPERATION 222.

If a determination is made that all of the necessary approvals from the selected stakeholders have been received, flow moves to GRANT OWNER PERMISSION TO IMPLEMENT PROPOSED MODIFICATION OPERATION 224. In GRANT OWNER PERMISSION TO IMPLEMENT PROPOSED MODIFICATION OPERATION 224, the owner is granted permission to implement the proposed modification. In accordance with one embodiment, multi-user participation role based administration application 112 has the collective permissions of all of the users, e.g., has the highest level or administrator permissions of computer system 100. Accordingly, multi-user participation role based administration application 112 has the permission to grant the owner permission to implement the proposed modification.

In one embodiment, the owner is only granted permission to implement the proposed modification. In accordance with this embodiment, the owner is not granted all of the permissions of the stakeholders, but only the permissions necessary to implement the proposed modification.

From GRANT OWNER PERMISSION TO IMPLEMENT PROPOSED MODIFICATION OPERATION 224, flow moves to and exits at EXIT OPERATION 212 or returns to RECEIVE PROPOSED MODIFICATION OPERATION 206 upon receipt of another proposed modification.

Returning again to NECESSARY APPROVALS RECEIVED CHECK OPERATION 222, if a determination is made that all of the necessary approvals from the selected stakeholders have not been received, flow moves to PROVIDE REJECTION NOTIFICATION OPERATION 226.

In PROVIDE REJECTION NOTIFICATION OPERATION 226, a notification is provided to the owner that the owner does not have all of the necessary permission to implement the proposed modification. More particularly, a notification is provided to the owner that the owner has not been granted permission to implement the proposed modification. Flow moves from PROVIDE REJECTION NOTIFICATION OPERATION 226 to EXIT OPERATION 212 and exits or returns to RECEIVE PROPOSED MODIFICATION OPERATION 206 when a new proposed modification is received.

Returning again to the example of FIG. 1, in NECESSARY APPROVALS RECEIVED CHECK OPERATION 222, a determination is made that all of the necessary approvals have been received. More particularly, the approval of stakeholder 120A has been received and is the only necessary approval in accordance with this example. Accordingly, owner 120B is granted permission to implement the proposed modification in GRANT OWNER PERMISSION TO IMPLEMENT PROPOSED MODIFICATION OPERATION 224. Owner 120B implements the proposed modification including reconfiguration of the firewall policy of firewall 106A.

Figure 3:
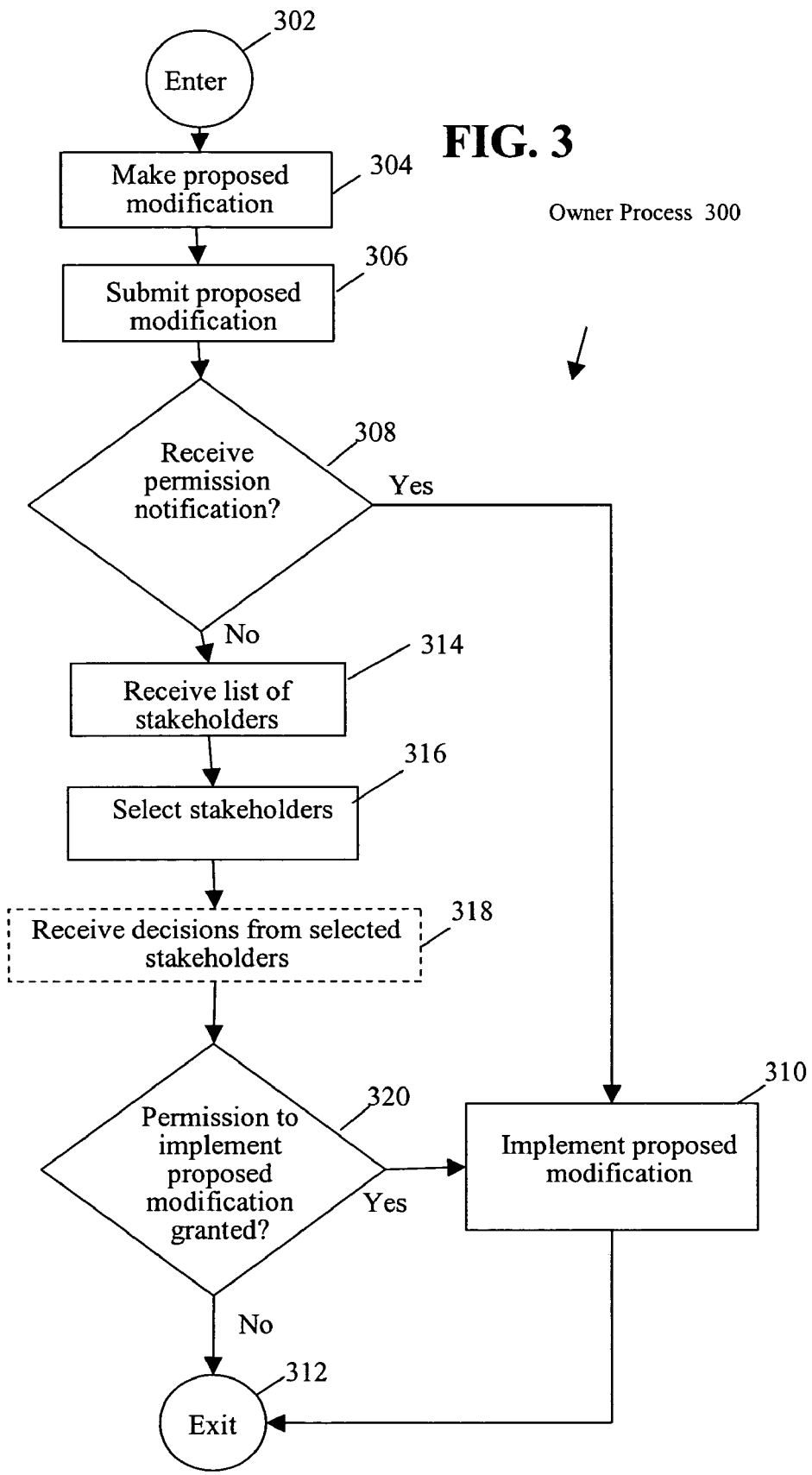
FIG. 3 is a flow diagram of an owner process in accordance with one embodiment of the present invention.

FIG. 3 is a flow diagram of an owner process 300 in accordance with one embodiment of the present invention. Execution of multi-user participation role based administration application 112 on central computer system 108 and/or one or more of computer systems 104 results in the operations of owner process 300 as described below in one embodiment.

Referring now to FIG. 3, from an ENTER OPERATION 302, flow moves to a MAKE PROPOSED MODIFICATION OPERATION 304. In MAKE PROPOSED MODIFICATION OPERATION 304, a user makes a proposed modification. In one embodiment, the proposed modification is a modification of a security policy or a network configuration or both. In another embodiment, the proposed modification includes a modification of a device or a type of configuration for which the user does not have permission to modify. A proposed modification does not take immediate affect.

For example, a user works on a proposed modification on a first computer, e.g., computer system 104B-1 of network 102B. This work may include multiple revisions to create the final proposed modification and may span a significant period of time, e.g., days or weeks.

From MAKE PROPOSED MODIFICATION OPERATION 304, flow moves to a SUBMIT PROPOSED MODIFICATION OPERATION 306. In SUBMIT PROPOSED MODIFICATION OPERATION 306, the user submits the proposed modification, e.g., to a change repository. For example, the user clicks on a send button on the first computer containing the proposed modification, e.g., computer system 104B-1, and the proposed modification is copied to a change repository, e.g., on a second computer such as central computer system 108.

Upon submission of the proposed modification, the user is assigned ownership of the proposed modification and becomes the owner of the proposed modification.

In accordance with one embodiment, the user that is assigned ownership of the proposed modification, sometimes called the original owner, is allowed to assign that ownership to another user, sometimes called the new owner. The new owner takes the place of the original owner.

From SUBMIT PROPOSED MODIFICATION OPERATION 306, flow moves to a RECEIVE PERMISSION NOTIFICATION CHECK OPERATION 308. In RECEIVE PERMISSION NOTIFICATION CHECK OPERATION 308, a determination is made as to whether the owner has received notification that the owner has all of the necessary permission to implement the proposed modification. As set forth above, this notification is provided in PROVIDE PERMISSION NOTIFICATION OPERATION 210 of FIG. 2.

If a determination is made that the owner has received notification that the owner has all of the necessary permission to implement the proposed modification, flow moves from RECEIVE PERMISSION NOTIFICATION CHECK OPERATION 308 to an IMPLEMENT PROPOSED MODIFICATION OPERATION 310. In accordance with this embodiment, the owner has permission to implement the proposed modification and there are no stakeholders in the proposed modification. Accordingly, the owner does not need a grant of permission.

In IMPLEMENT PROPOSED MODIFICATION OPERATION 310, the owner implements the proposed modification. Once implemented, the proposed modification becomes an actual modification and is put into effect. From IMPLEMENT PROPOSED MODIFICATION OPERATION 310, flow moves to and exits at an EXIT OPERATION 312 or returns to MAKE PROPOSED MODIFICATION OPERATION 304 in the event the owner makes another proposed modification.

Returning again to RECEIVE PERMISSION NOTIFICATION CHECK OPERATION 308, if a determination is made that the owner has not received notification that the owner has all of the necessary permissions to implement the proposed modification, flow moves from to a RECEIVE LIST OF STAKEHOLDERS OPERATION 314. In accordance with this embodiment, the owner does not have all of the necessary permission to implement the proposed modification and there are stakeholders in the proposed modification. Accordingly, the list of stakeholders is provided to the owner in RECEIVE LIST OF STAKEHOLDERS OPERATION 314.

In accordance with one embodiment, the owner either receives a permission notification in RECEIVE PERMISSION NOTIFICATION CHECK OPERATION 308 or receives a list of stakeholders in RECEIVE LIST OF STAKEHOLDERS OPERATION 314, i.e., a notification that the owner does not have all of the necessary permission to implement the proposed modification is not sent to and received by the owner in RECEIVE PERMISSION NOTIFICATION CHECK OPERATION 308. In yet another embodiment, the owner receives either a permission notification in RECEIVE PERMISSION NOTIFICATION CHECK OPERATION 308 or receives a notification that the owner does not have all of the necessary permission to implement the proposed modification in RECEIVE PERMISSION NOTIFICATION CHECK OPERATION 308 and a list of stakeholders in RECEIVE LIST OF STAKEHOLDERS OPERATION 314.

From RECEIVE LIST OF STAKEHOLDERS OPERATION 314, flow moves to a SELECT STAKEHOLDERS OPERATION 316. In SELECT STAKEHOLDERS OPERATION 316, the owner selects the particular stakeholder or stakeholders from which approvals of the proposed modification within the stakeholder's area of ownership will be requested.

The selection of stakeholders is not complete until the owner selects particular stakeholders that collectively have the combined permissions to implement the proposed modification. In one embodiment, if the selection of stakeholders is not sufficient, the owner is provided a notification that additional stakeholders must be selected.

In another embodiment, groups, e.g., sets, of stakeholders are presented to the owner, where each group contains sufficient permissions to implement the proposed modification. In accordance with this embodiment, the owner simply makes a selection of a single group.

From SELECT STAKEHOLDERS OPERATION 316, flow moves, optionally, to a RECEIVE DECISIONS FROM SELECTED STAKEHOLDERS OPERATION 318. In RECEIVE DECISIONS FROM SELECTED STAKEHOLDERS OPERATION 318, the owner receives the rejection or approval, i.e., decision, of the proposed modification from each of the stakeholders.

In one embodiment, by receiving the decisions of the stakeholders, the owner monitors the status of approval of the proposed modification. For example, if one of the selected stakeholders is non-responsive, the owner can contact that stakeholder directly and solicit a decision.

In another embodiment, the owner is not notified of the decisions of the stakeholders, but is either granted permission or not in a PERMISSION TO IMPLEMENT PROPOSED MODIFICATION GRANTED CHECK OPERATION 320, as discussed further below. In accordance with this embodiment, RECEIVE DECISIONS FROM SELECTED STAKEHOLDERS OPERATION 318 is not performed and thus is an optional operation.

From RECEIVE DECISIONS FROM SELECTED STAKEHOLDERS OPERATION 318 (or from SELECT STAKEHOLDERS OPERATION 316 if RECEIVE DECISIONS FROM SELECTED STAKEHOLDERS OPERATION 318 is not performed), flow moves to PERMISSION TO IMPLEMENT PROPOSED MODIFICATION GRANTED CHECK OPERATION 320. In PERMISSION TO IMPLEMENT PROPOSED MODIFICATION GRANTED CHECK OPERATION 320, a determination is made as to whether permission to implement the proposed modification has been granted.

If a determination is made that permission to implement the proposed modification has been granted, flow moves from PERMISSION TO IMPLEMENT PROPOSED MODIFICATION GRANTED CHECK OPERATION 320 to IMPLEMENT PROPOSED MODIFICATION OPERATION 310, which is performed as discussed above. Conversely, if a determination is made that permission to implement the proposed modification has not been granted, flow moves to and exits at EXIT OPERATION 312 or returns to MAKE PROPOSED MODIFICATION OPERATION 304 in the event the owner makes another proposed modification.

Figure 4:
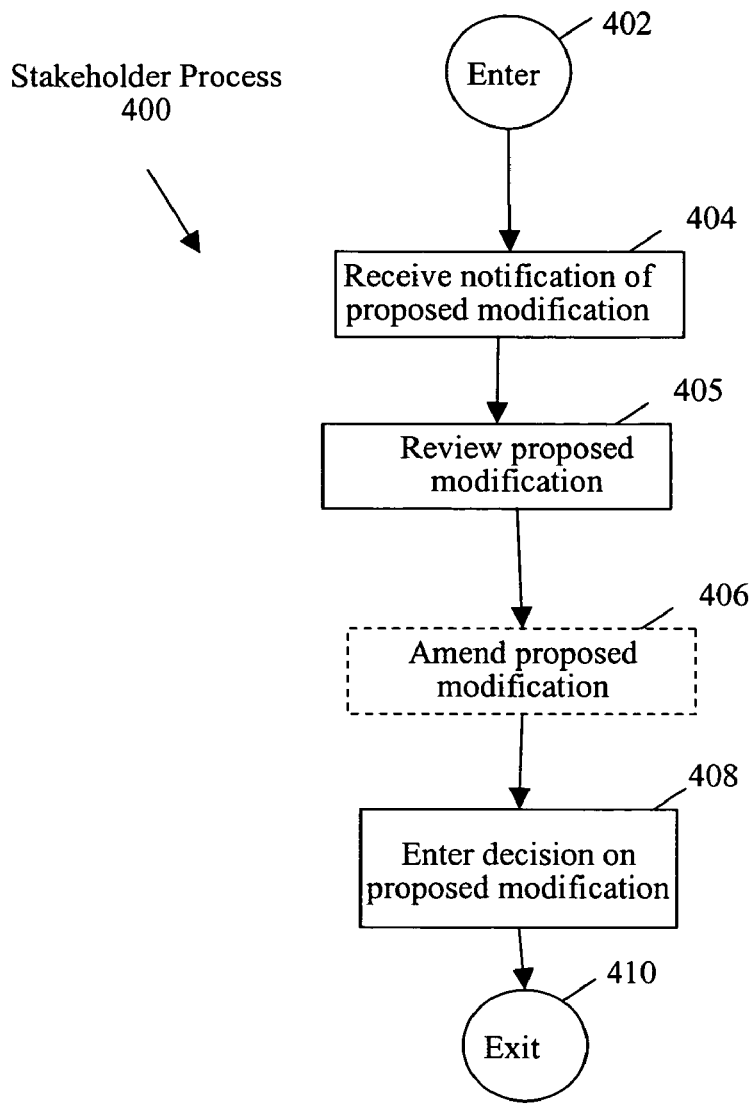
FIG. 4 is a flow diagram of a stakeholder process in accordance with one embodiment of the present invention.

FIG. 4 is a flow diagram of a stakeholder process 400 in accordance with one embodiment of the present invention. Execution of multi-user participation role based administration application 112 on central computer system 108 and/or one or more of computer systems 104 results in the operations of stakeholder process 400 as described below in one embodiment.

Referring now to FIG. 4, from an ENTER OPERATION 402, flow moves to a RECEIVE NOTIFICATION OF PROPOSED MODIFICATION OPERATION 404. In RECEIVE NOTIFICATION OF PROPOSED MODIFICATION OPERATION 404, a stakeholder receives a notification of a proposed modification. Illustratively, the stakeholder is notified during NOTIFY SELECTED STAKEHOLDERS OF PROPOSED MODIFICATION OPERATION 218 of FIG. 2.

From RECEIVE NOTIFICATION OF PROPOSED MODIFICATION OPERATION 404, flow moves to a REVIEW PROPOSED MODIFICATION OPERATION 405. In REVIEW PROPOSED MODIFICATION OPERATION 405, the stakeholder reviews the proposed modification. In one embodiment, the stakeholder accesses the change repository where the proposed modification has been submitted and posted.

From REVIEW PROPOSED MODIFICATION OPERATION 405, flow moves, optionally, to an AMEND PROPOSED MODIFICATION OPERATION 406. In AMEND PROPOSED MODIFICATION OPERATION 406, the stakeholder amends the proposed modification. In one embodiment, the stakeholder is only allowed to amend the proposed modification if the entire change, sometimes called amendment, of the proposed modification is within the area of ownership of the stakeholder. More particularly, if the amendment of the proposed modification extends outside of the area of ownership of the stakeholder, the stakeholder is prohibited from amending the proposed modification.

In another embodiment, the stakeholder has only the option of approving or rejecting the proposed modification, i.e., does not have the option of amending the proposed modification. In accordance with this embodiment, AMEND PROPOSED MODIFICATION OPERATION 406 is not performed and thus is an optional operation.

In yet another embodiment, the stakeholder does not want to amend the proposed modification, but simply wants to approve or reject the proposed modification. In accordance with this embodiment, AMEND PROPOSED MODIFICATION OPERATION 406 is not performed and again is an optional operation.

From AMEND PROPOSED MODIFICATION OPERATION 406 (or from REVIEW PROPOSED MODIFICATION OPERATION 405 if AMEND PROPOSED MODIFICATION OPERATION 406 is not performed), flow moves to an ENTER DECISION ON PROPOSED MODIFICATION OPERATION 408. In ENTER DECISION ON PROPOSED MODIFICATION OPERATION 408, the stakeholder enters the stakeholder's decision on the proposed modification. More particularly, the stakeholder either approves or rejects the proposed modification.

In one embodiment when the proposed modification was amended by the stakeholder in AMEND PROPOSED MODIFICATION OPERATION 406 as set forth above, the approval of the proposed modification by the stakeholder is subject to implementation of the amendment of the proposed modification made by the stakeholder.

In another embodiment, the stakeholder rejects the proposed modification and includes comments on why the proposed modification was rejected. The owner can start again and create a new proposed modification incorporating the comments.

From ENTER DECISION ON PROPOSED MODIFICATION OPERATION 408, flow moves to and exits at an EXIT OPERATION 410.

As set forth above, in accordance with one embodiment of the present invention, a user (owner) is allowed to initiate and drive a task for which two or more principles (stakeholders) must be involved. Users' roles, instead of being a limit on a user's abilities, are used to create areas of ownership, i.e., fiefdoms, enabling an owner to accomplish the task.

In accordance with this embodiment, a user is allowed to make a modification, despite the user's level of permissions. The modifications do not take immediate affect. The modifications are submitted to a change repository, and the user is assigned ownership, i.e., becomes the owner of the proposed modification.

The stakeholders in the proposed modification are notified. Upon receiving the notification, each stakeholder enters the system, reviews the proposed modification, and rejects or approves the proposed modification. Once the owner receives the approvals from all of the necessary stakeholders, the proposed modification is implemented by the owner and put into effect.

Figure 5:
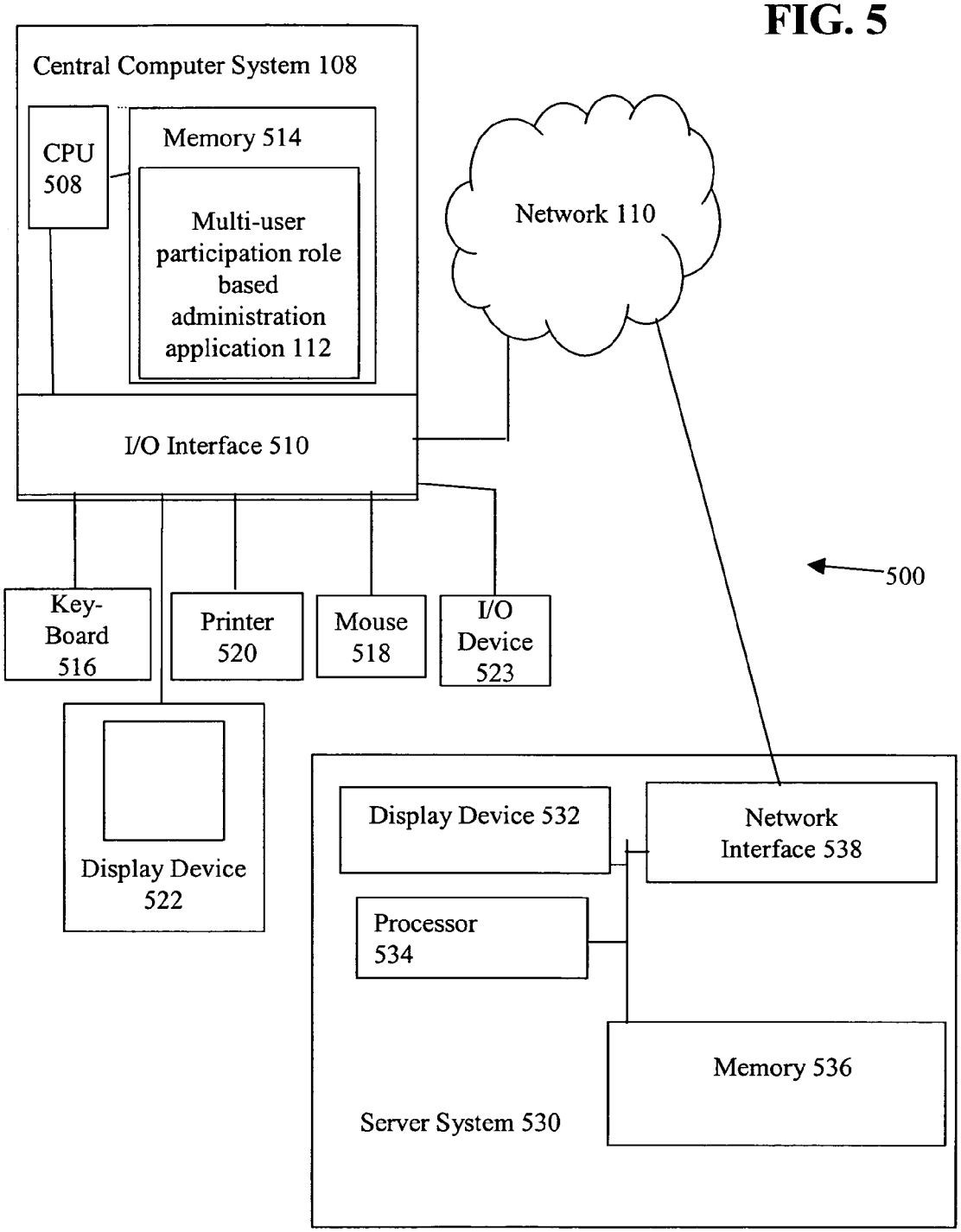
FIG. 5 is a diagram of a client-server system that includes a multi-user participation role based administration application executing on a central computer system in accordance with one embodiment of the present invention.

FIG. 5 is a diagram of a client-server system 500 that includes multi-user participation role based administration application 112 executing on a central computer system 108, e.g., a first computer system, in accordance with one embodiment of the present invention. Referring now to FIGS. 1 and 5 together, central computer system 108 is representative of central computer system 108 of FIG. 1 in one embodiment. Further, client-server system 500 is part of computer system 100 in one embodiment.

Central computer system 108, sometimes called a client or user device, typically includes a central processing unit (CPU) 508, hereinafter processor 508, an input output (I/O) interface 510, and a memory 514. Central computer system 108 may further include standard devices like a keyboard 516, a mouse 518, a printer 520, and a display device 522, as well as, one or more standard input/output (I/O) devices 523, such as a compact disk (CD) or DVD drive, floppy disk drive, or other digital or waveform port for inputting data to and outputting data from central computer system 108. In one embodiment, multi-user participation role based administration application 112 is loaded into central computer system 108 via I/O device 523, such as from a CD, DVD or floppy disk containing multi-user participation role based administration application 112.

Central computer system 108 is coupled to a server system 530 of client-server system 500 by network 110. Server system 530 typically includes a display device 532, a processor 534, a memory 536, and a network interface 538.

Network 110 can be any network or network system that is of interest to a user. In various embodiments, network interface 538 and I/O interface 510 include analog modems, digital modems, or a network interface card.

Multi-user participation role based administration application 112 is stored in memory 514 of central computer system 108 and executed on central computer system 108. The particular type of and configuration of central computer system 108 and server system 530 are not essential to this embodiment of the present invention.

Multi-user participation role based administration application 112 is in computer memory 514. As used herein, a computer memory refers to a volatile memory, a non-volatile memory, or a combination of the two.

Although multi-user participation role based administration application 112 is referred to an application, this is illustrative only. Multi-user participation role based administration application 112 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 5, this medium may belong to the computer system itself. However, the medium also may be removed from the computer system. For example, multi-user participation role based administration application 112 may be stored in memory 536 that is physically located in a location different from processor 508. Processor 508 should be coupled to the memory 536. This could be accomplished in a client-server system, or alternatively via a connection to another computer via modems and analog lines, digital interfaces and a digital carrier line, or wireless or cellular connections.

More specifically, in one embodiment, central computer system 108 and/or server system 530 is a portable computer, a workstation, a two-way pager, a cellular telephone, a smart phone, a digital wireless telephone, a personal digital assistant, a server computer, an Internet appliance, or any other device that includes components that can execute the multi-user participation role based administration functionality in accordance with at least one of the embodiments as described herein. Similarly, in another embodiment, central computer system 108 and/or server system 530 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the multi-user participation role based administration functionality in accordance with one embodiment of the present invention can be implemented in a wide variety of computer system configurations. In addition, the multi-user participation role based administration functionality could be stored as different modules in memories of different devices. For example, multi-user participation role based administration application 112 could initially be stored in server system 530, and then as necessary, a portion of multi-user participation role based administration application 112 could be transferred to central computer system 108 and executed on central computer system 108. Consequently, part of the multi-user participation role based administration functionality would be executed on processor 534 of server system 530, and another part would be executed on processor 508 of central computer system 108. In view of this disclosure, those of skill in the art can implement various embodiments of the present invention in a wide-variety of physical hardware configurations using an operating system and computer programming language of interest to the user.

In yet another embodiment, multi-user participation role based administration application 112 is stored in memory 536 of server system 530. Multi-user participation role based administration application 112 is transferred over network 110 to memory 514 in central computer system 108. In this embodiment, network interface 538 and I/O interface 510 would include analog modems, digital modems, or a network interface card. If modems are used, network 110 includes a communications network, and multi-user participation role based administration application 112 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:

defining areas of ownership for users of a computer system, said areas of ownership comprising areas in which said users have permission to modify security policy configurations;

receiving a proposed modification of one or more of said security policy configurations from a first user of said users, said first user being an owner of said proposed modification, wherein a set of said users are stakeholders in said proposed modification; and receiving decisions from a selected set of said stakeholders on approval of said proposed modification.

2. The method of claim 1 further comprising providing a list of said stakeholders to said owner.

3. The method of claim 2 further comprising receiving a selection of said set of said stakeholders from said owner.

4. The method of claim 3 further comprising providing a notification to said set of said stakeholders of said proposed modification.

5. The method of claim 1 wherein at least one of said set of said stakeholders rejects said proposed modification.

6. The method of claim 5 further comprising providing a rejection notification to said owner.

7. The method of claim 1 further comprising determining if all necessary approvals have been received.

8. The method of claim 7 wherein said determining if all necessary approvals have been received comprises determining if said set of said stakeholders approved said proposed modification.

9. The method of claim 8 wherein said set of said stakeholders approved said proposed modification if all stakeholders of said set of said stakeholders approved said proposed modification.

10. The method of claim 7 wherein a determination is made that said all necessary approvals have been received, said method further comprising granting said owner permission to implement said proposed modification.

11. The method of claim 10 wherein said owner implements said proposed modification.

12. The method of claim 1 further comprising:

receiving a notification of said proposed modification;
reviewing said proposed modification; and
entering a decision of said proposed modification.

13. The method of claim 12 further comprising amending said proposed modification.

14. The method of claim 1 further comprising assigning an ownership of said proposed modification from said owner to a new owner.

15. The method of claim 1 wherein said security policy configurations comprise configurations selected from the group consisting of firewall configurations, anti-virus application configurations and intrusion detection system configurations.

16. The method of claim 1 wherein said areas of ownership further comprise areas in which said users have permission to modify network configurations of physical network structures used to interconnect devices.

17. The method of claim 1 wherein an area of ownership for said first user is a first network and an area of ownership for a first stakeholder of said stakeholders is a second network, said proposed modification comprising a reconfiguration of a firewall policy of a firewall in said second network.

18. A method comprising:

defining areas of ownership for users of a computer system, said areas of ownership comprising areas in which said users have permission to modify security policy configurations;

receiving a proposed modification of one or more of said security policy configurations from a first user of said users, said first user being an owner of said proposed modification;

determining that said owner has permission to implement said proposed modification; and providing a permission notification to said owner.

19. The method of claim 18 wherein said owner implements said proposed modification upon receiving said permission notification.

20. A method comprising:

submitting a proposed modification of one or more security policy configurations;

receiving a list of stakeholders in said proposed modification;

selecting a set of said stakeholders; and determining if permission to implement said proposed modification has been granted.

21. The method of claim 20 wherein upon a determination that said permission to implement said proposed modification has been granted, said method further comprising implementing said proposed modification.

22. The method of claim 20 further comprising receiving approval decisions on said proposed modification from said set of said stakeholders.

23. The method of claim 20 further comprising making said proposed modification.

24. A system comprising:

a means for defining areas of ownership for users of a computer system, said areas of ownership comprising areas in which said users have permission to modify security policy configurations;

a means for receiving a proposed modification of one or more of said security policy configurations from a first user of said users, said first user being an owner of said proposed modification, wherein a set of said users are stakeholders in said proposed modification; and a means for receiving decisions from a selected set of said stakeholders on approval of said proposed modification.

25. A computer-program product comprising a tangible computer-readable storage medium containing computer program code comprising:

a multi-user participation role based administration application for defining areas of ownership for users of a computer system, said areas of ownership comprising areas in which said users have permission to modify security policy configurations;

said multi-user participation role based administration application for receiving a proposed modification of one or more of said security policy configurations from a first user of said users, said first user being an owner of said proposed modification, wherein a set of said users are stakeholders in said proposed modification; and said multi-user participation role based administration application for receiving decisions from a selected set of said stakeholders on approval of said proposed modification.

26. A computer system comprising:

a memory having stored therein a multi-user participation role based administration application; and a processor coupled to said memory, wherein execution of said multi-user participation role based administration application generates a method comprising:

defining areas of ownership for users of a computer system, said areas of ownership comprising areas in which said users have permission to modify security policy configurations;

receiving a proposed modification of one or more of said security policy configurations from a first user of said users, said first user being an owner of said proposed modification, wherein a set of said users are stakeholders in said proposed modification; and receiving decisions from a selected set of said stakeholders on approval of said proposed modification.

* * * * *